Nov. 2, 1965    M. L. BENJAMIN ETAL    3,215,445
TOOL HOLDER AND ADAPTER
Filed Dec. 28, 1962
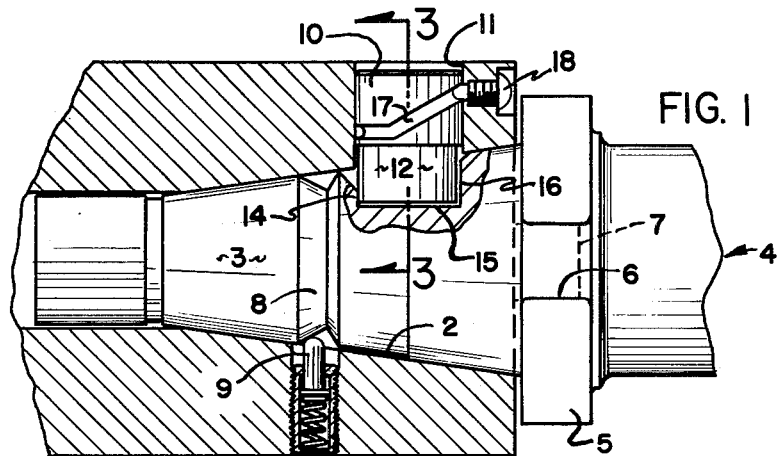
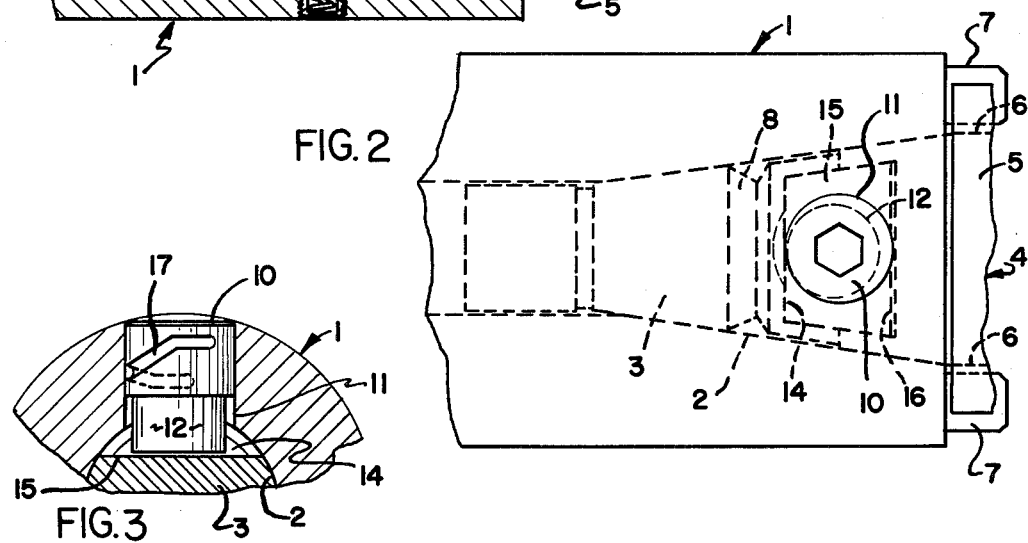
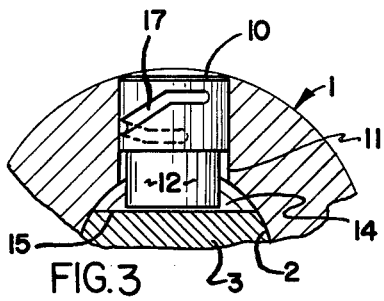
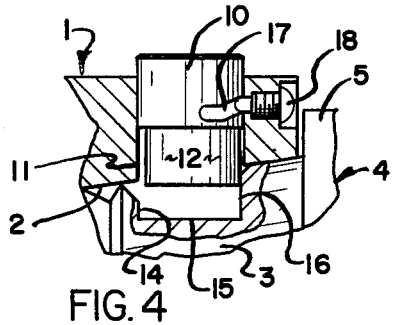
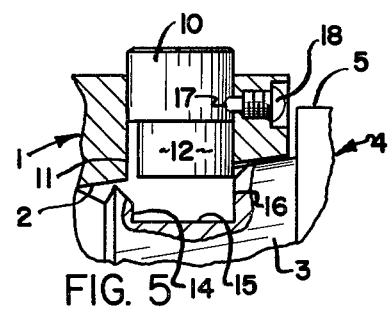
INVENTORS
MILTON L. BENJAMIN &
FRANKLYN E. WINNEN
BY
Oberlin, Maky & Donnelly
ATTORNEYS

United States Patent Office 3,215,445
Patented Nov. 2, 1965

---

3,215,445
TOOL HOLDER AND ADAPTER
Milton L. Benjamin, Shaker Heights, and Franklyn E. Winnen, Cleveland, Ohio, assignors to Erickson Tool Company, Solon, Ohio, a corporation of Ohio
Filed Dec. 28, 1962, Ser. No. 248,147
5 Claims. (Cl. 279—97)

The present invention relates generally to a tool holder and adapter and, more particularly, to a tool holder and adapter of the type wherein the tapered shank of a tool, milling machine arbor and adapter or the like is seated in a socket member which may be the spindle nose of a milling machine, boring machine or the like.

It is a principal object of this invention to provide a tool holder and adapter characterized in that mating tapered surfaces thereof are seated and unseated by cam action which applies seating and unseating forces along lines which extend substantially parallel to the central axes of such mating tapered surfaces.

It is another object of this invention to provide a tool holder and adapter which, even in the case of a vertical milling machine, for example, can be locked together and unlocked as a one-hand operation.

It is another object of this invention to provide a tool holder and adapter characterized in that the cam member, as an incident of its unlocking or unseating movement, moves to a position clearing the shank member for axial withdrawal from the socket member.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawing:

FIG. 1 is a central longitudinal cross-section view taken substantially along the line 1—1, FIG. 2 showing socket and shank members locked together;

FIG. 2 is a top plan view as viewed from the top of FIG. 1;

FIG. 3 is a fragmentary transverse cross-section view taken substantially along the line 3—3, FIG. 1; and FIGS. 4 and 5 are fragmentary longitudinal cross-section views illustrating the manner in which the cam member operates to effect unseating or unlocking of the complemental socket and shank members.

Referring now more particularly to the drawing, the reference numeral 1 denotes a socket member which has a tapered self-releasing bore 2 (American Standard taper of 3.5 in. per ft., for example) adjacent one end to receive the tapered shank 3 of a tool holder or arbor 4, the later having an integral flange 5 which has diametrically opposite notches 6 engaged with driving keys or lugs 7 projecting axially from the end of the socket member 1.

The tapered shank 3 has a peripheral recess or groove 8 in which are engaged a plurality of spring detents 9, usually three in number, which are operative to yieldably retain the tool holder 4, when inserted, so that the operator need not hold it especially in vertical milling machine or the like while the cam member 10 is actuated to seat the shank 3 in the tapered bore 2.

The cam member 10 aforesaid is rotatable in a radial opening 11 adjacent the end of the socket member 1 and has an inner eccentric cam portion 12 which engages one side 14 of the transverse groove 15 formed in the tapered shank 3 to firmly seat the latter in the socket member 1 and which engages the opposite side 16 of said groove 15 to unseat the tapered shank 3 from the socket member 1. As the cam member 10 is rotated in opposite directions it is at the same time moved radially by reason of the cam groove 17 in which is engaged the inner end of an axially extending pin 18 mounted in socket member 1.

When the cam member 10 is in the position shown in either FIG. 4 or FIG. 5, it is disposed radially outward a sufficient distance to permit insertion of the shank 3 of the tool holder or arbor 4, and the detents 9 yieldably retains the holder 4 in the thus inserted position so that the machine operator need only use one hand for turning the cam member 10 as with a hex key (not shown) to cause the eccentric cam portion 12 to be moved radially inward and to apply axial force on side 14 of groove 15 substantially parallel to the central longitudinal axis of the assembly to firmly seat the tapered shank 3 in the bore 2 of socket member 1. When it is desired to remove the tool holder or arbor 4 all that the machine operator has to do is to turn the cam member 10 in the opposite direction, whereupon it moves radially outward with the eccentric portion 12 engaging the opposite side 16 of the transverse groove 15 to unseat the holder or arbor 4 from the socket member 1 by axial force as shown in FIG. 5. The tool holder 4 can then be readily removed and another one inserted.

Other modes of applying the principle of the invention may be employed, change being made as regards the details described, provided the features stated in any of the following claims, or the equivalent of such, be employed.

We therefore particularly point out and distinctly claim as our invention:

1. In combination, a socket member having a tapered bore; a shank member having a tapered shank including a transverse groove thereacross; a radially disposed cam member mounted in said socket member for turning in opposite directions; said cam member having a radially inner cam portion which, upon rotation of said cam member in opposite directions, engages opposite sides of such groove to force said shank into and out of engagement with such bore; and means in said socket member cooperating with said cam member to move said cam member radially inward for engagement with one side of such groove and radially outward for radially clearing such one side while engaging the other side of such groove.

2. The combination of claim 1 wherein said last-mentioned means comprises an axially extending pin in said socket member which engages a cam groove in said cam member.

3. For use with a socket member having a tapered bore, a cam member which is rotatable in said socket member about an axis extending radially of said socket member, means mounting said cam member for radial movement to and from a position with its radially inner portion disposed radially inward of said tapered socket and at two different axial positions relative to said socket in response to rotational movement of said cam member in opposite directions, and a radially yieldable spring detent, a shank member having a tapered shank adapted to be axially inserted within said socket, said shank having a transverse groove of which opposite sides are adapted to be respectively engaged by the inner portion of said cam member at such different axial positions for respectively axially pushing said shank against and away from the tapered bore of the socket member, said shank further having a recess for yieldable engagement by the spring detent.

4. In combination, a socket member having a tapered bore; a shank member having a tapered shank including a transverse groove thereacross; a cam member mounted in a radially disposed opening in said socket member and rotatable therein to cooperate with such groove to force said shank into engagement with such bore; complemental detent-recess means on said socket member and shank member effective yieldably to hold said members together; and means in said socket member operative progressively to move said cam member radially inward into such groove as said cam member is rotated in one direction whereby the inner portion of said cam member engages one side of such groove.

5. The combination of claim 4 wherein said last-mentioned means is also operative progressively to move said cam member radially outward, upon rotation in the opposite direction, to a position whereat said inner portion engages the opposite side of said groove to force said shank out of engagement with said bore and radially clears said one side for withdrawal of said shank member from said socket member.

References Cited by the Examiner
UNITED STATES PATENTS

| | | | |
|---|---|---|---|
| 1,788,268 | 1/31 | Anderson | 279—103 |
| 2,167,014 | 7/39 | Verderber | 279—103 |
| 2,612,377 | 9/52 | Edens | 279—76 |
| 2,781,199 | 2/57 | Veldhuizen | 279—97 |
| 2,816,770 | 12/57 | De Vlieg | 279—97 |

FOREIGN PATENTS 123,733    1/49    Sweden.

ROBERT C. RIORDON, *Primary Examiner.*

FRANK SUSKO, *Examiner.*